Figure 1:
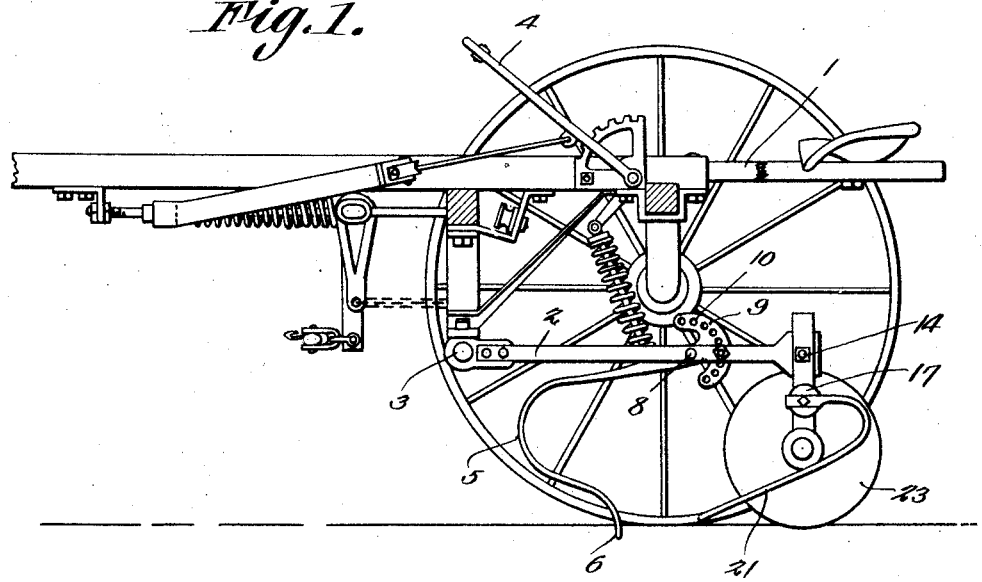

Inventor
J. H. J. Counts

Oct. 12, 1926. 1,602,651
J. H. J. COUNTS
DEVICE FOR CULTIVATORS
Filed May 11, 1925 2 Sheets-Sheet 2

Inventor
J. H. J. Counts
By C. A. Snow & Co.
Attorneys

Patented Oct. 12, 1926.

1,602,651

UNITED STATES PATENT OFFICE.

JOHN H. J. COUNTS, OF OCALA, FLORIDA.

DEVICE FOR CULTIVATORS.

Application filed May 11, 1925. Serial No. 29,590.

This invention aims to provide novel means for handling growing vines in such a way that the soil about the vines may be cultivated.

It is within the province of the disclosure to improve generally and to enhance the utility of devices of that sort to which the invention appertains:

Although a preferred form of the invention has been disclosed in the drawings, it will be understood that a mechanic, working within the scope of what is claimed, may make such changes as his skill may suggest, without departing from the spirit of the invention.

In the accompanying drawings:—

Figures 2, 3:
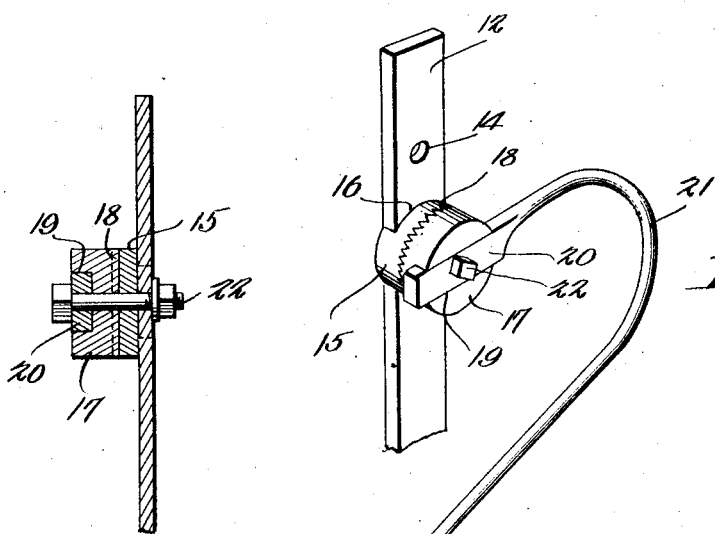
Figure 4:
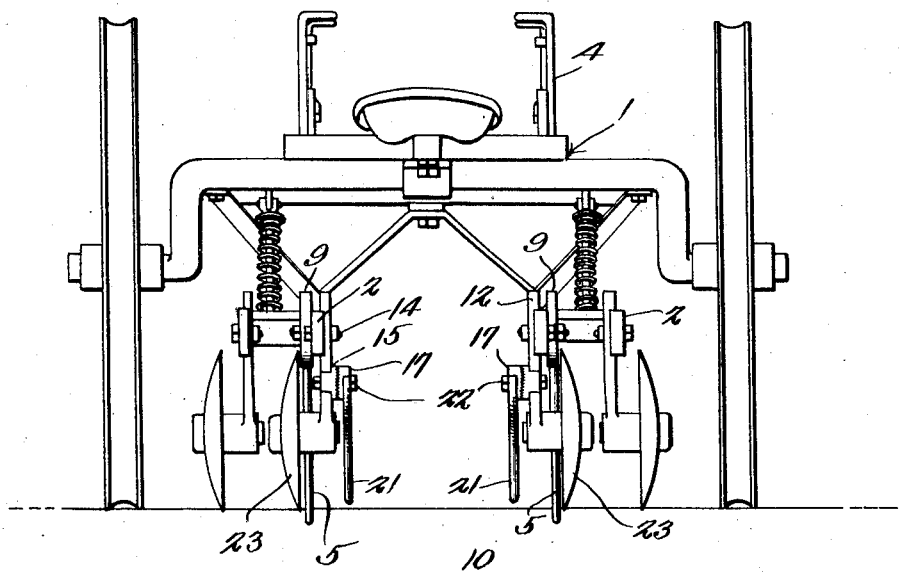
Figure 5:
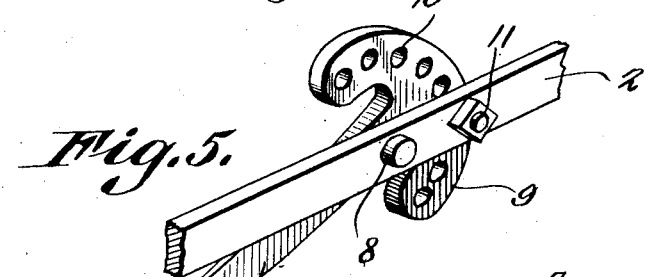
Figure 6:
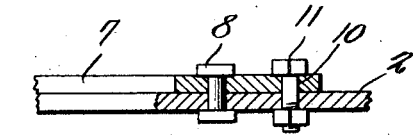

Figure 1 shows in longitudinal section, a cultivator equipped with the device forming the subject matter of this application; Figure 2 is a longitudinal sectional view showing the mounting for the lifter; Figure 3 is a perspective view showing the lifter and attendant parts; Figure 4 is a rear elevation disclosing a cultivator equipped with the device forming the subject matter of this application; Figure 5 is a perspective view of the rake and attendant parts; Figure 6 is a longitudinal section taken through a portion of the mechanism disclosed in Figure 5.

The numeral 1 designates the frame of a wheel-mounted straddle-row cultivator, comprising beams 2 which are pivotally connected at 3 with the frame 1, for vertical swinging movement, means 4 being supplied whereby an operator can adjust the beams 2 vertically.

In carrying out the invention, rakes 5 are provided, the rakes being extended forwardly and curved downwardly, the rakes being reversely curved to form fingers 6, each rake comprising a body 7 connected by a pivot element 8 with one of the beams 2, each rake having a head 9 provided with a plurality of openings 10 disposed in an arc whereof the pivot element 8 is a center. A securing element 11, such as a bolt, is mounted in the beam 2 and is adapted to be engaged in any of the openings 10, to adjust the position of the finger 6 with respect to the surface of the soil.

A vertical standard 12 is secured at 14 to the rear end of the innermost beams 2, a cultivator disk 23, or any other suitable soil-engaging element, being mounted on the lower end of the standard 14. The numeral 15 marks a bracket having a recess 16 receiving the standard 12, as shown in Figure 3. The numeral 17 designates a hub. The hub 17 and the bracket 15 are supplied upon their inner surfaces wth radial ribs 18. In the outer surface of the hub 17 there is a seat 19 adapted to receive the end 20 of a curved and forwardly and downwardly extended lifter 21. A connecting device 22, which may be a bolt, extends through the standard 12, the bracket 15, the hub 17, and the end 20 of the lifter 21 and holds the parts assembled. However, by loosening the connecting device 22, the hub 17 may be adjusted circumferentially, thereby to vary the position of the lifter 21 with respect to the surface of the soil, the ribs 18 engaging again, in a well known way, to prevent relative movement between the parts 15 and 17, when the connecting device 22 is tightened up. The lifter 21 is located at the side of the corresponding cultivator disks 23, as shown in Figure 1, and extends to the front of the said disks. The rakes 5 are located in advance of the lifters 21. Referring to Figure 4, it will be observed that the lifters 21 are disposed nearer to the longitudinal center of the vehicle than are the rakes 5.

In practical operation, as the cultivator moves forward, the rakes 5 engage the laterally extended vines and tend to comb or straighten them out, so that they lie very nearly parallel to the line of advance of the cultivator and at the sides of the row. As the vehicle moves along, the lifters 21 pick up the vines and raise them, so that the elements 23 may cultivate the vines on each side of the row.

The parts shown in Figures 3 and 5 of the drawings may be assembled with cultivators of widely different sorts.

Having thus described the invention, what is claimed is:—

The combination with a frame and a soil-engaging element thereon, and a vine lifter extended forwardly with respect to the soil-engaging element, of a vine rake embodying a forwardly extended U-shaped part, including an upper arm and a lower arm, the lower arm slanting downwardly and rearwardly and being reversely curved so as to bring its lower end into contact with the soil at an angle which approaches closely to perpendicularity with respect to the surface of the soil, and means for connecting the upper arm to the frame in such a way as to locate the vine rake forwardly of the soil-engaging element and the vine lifter.

In testimony that I claim the foregoing as my own, I have hereto affixed my signature.

JOHN H. J. COUNTS.